(12) United States Patent
Kano et al.

(10) Patent No.: US 9,692,342 B2
(45) Date of Patent: Jun. 27, 2017

(54) BRUSHLESS MOTOR AND MOTOR CONTROL DEVICE

(71) Applicant: DENSO CORPORATION, Kariya, Aichi-pref. (JP)

(72) Inventors: Ryo Kano, Obu (JP); Takashi Suzuki, Kariya (JP); Hideki Kabune, Nagoya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 21 days.

(21) Appl. No.: 14/867,438

(22) Filed: Sep. 28, 2015

(65) Prior Publication Data

US 2016/0118923 A1   Apr. 28, 2016

(30) Foreign Application Priority Data

Oct. 24, 2014  (JP) .................. 2014-217008

(51) Int. Cl.
| | |
|---|---|
| *H02P 21/00* | (2016.01) |
| *H02P 25/22* | (2006.01) |
| *H02K 3/28* | (2006.01) |
| *H02P 29/66* | (2016.01) |
| *B62D 5/04* | (2006.01) |

(52) U.S. Cl.
CPC ............ *H02P 25/22* (2013.01); *B62D 5/0403* (2013.01); *B62D 5/046* (2013.01); *B62D 5/0496* (2013.01); *H02K 3/28* (2013.01); *H02P 29/66* (2016.02)

(58) Field of Classification Search
CPC ....... H02P 25/22; H02P 29/66; B62D 5/0403; B62D 5/046; B62D 5/0496; H02K 3/28; H02K 11/25; F04C 2240/403; F04C 28/08; F04C 29/045; G11B 5/70678; H01F 1/0009
USPC ..... 318/400.02, 724, 473, 634, 641, 400.22, 318/471

See application file for complete search history.

(56) References Cited

U.S. PATENT DOCUMENTS

| | | | | |
|---|---|---|---|---|
| 6,652,238 | B2 * | 11/2003 | Kajiwara ............... | F04C 28/08 417/44.1 |
| 7,486,038 | B2 * | 2/2009 | Amagasa ................. | B60S 1/08 318/400.21 |
| 8,604,739 | B2 * | 12/2013 | Atarashi ............... | B60L 15/025 310/112 |
| 8,912,739 | B2 * | 12/2014 | Kobayashi ........... | H02P 21/141 318/400.02 |
| 9,257,930 | B2 * | 2/2016 | Suzuki ............... | H02P 21/0096 |
| 9,571,017 | B2 * | 2/2017 | Hirotani ................. | H02P 25/22 |

(Continued)

FOREIGN PATENT DOCUMENTS

| | | |
|---|---|---|
| JP | 2012-186917 A | 9/2012 |
| JP | 2013-48524 A | 3/2013 |

*Primary Examiner* — Rita Leykin
(74) *Attorney, Agent, or Firm* — Knobbe, Martens, Olson & Bear, LLP

(57) ABSTRACT

A brushless motor for an electric power steering device that assists a steering operation includes: a stator having a plurality of winding sets for a plurality of systems respectively; and a rotator having a ferrite magnet. In the motor, a maximum current flowing without any demagnetization at high temperature is large. Hence, the torque of the motor is easily ensured at high temperature. In particular, when a failure occurs in one system, it is easy to ensure the torque of the normal system even at high temperature.

6 Claims, 14 Drawing Sheets

(56) References Cited

U.S. PATENT DOCUMENTS

| | | | |
|---|---|---|---|
| 2011/0074333 A1 | 3/2011 | Suzuki | |
| 2012/0249024 A1* | 10/2012 | Saha | H02P 21/06 318/400.02 |
| 2013/0285591 A1* | 10/2013 | Suzuki | H02P 25/22 318/724 |
| 2013/0313938 A1 | 11/2013 | Yamada et al. | |
| 2014/0354204 A1* | 12/2014 | Tachibana | H02P 6/08 318/473 |
| 2015/0022126 A1* | 1/2015 | Schulz | H02P 21/22 318/400.02 |
| 2015/0091481 A1* | 4/2015 | Tago | H02P 6/002 318/400.2 |
| 2015/0145442 A1* | 5/2015 | Miyamoto | B60K 6/445 318/98 |

* cited by examiner

BRUSHLESS MOTOR AND MOTOR CONTROL DEVICE

CROSS REFERENCE TO RELATED APPLICATION

This application is based on Japanese Patent Application No. 2014-217008 filed on Oct. 24, 2014, the disclosures of which are incorporated herein by reference.

TECHNICAL FIELD

The present disclosure relates to a brushless motor and a motor control device in an electric power steering device.

BACKGROUND

Up to now, an electric power steering device (EPS) that assists steering operation by a drive force of a motor is employed in a vehicle steering system. In the EPS, a brushless motor including multiple systems each having an inverter and a winding set whose energization is controlled by the inverter from the viewpoint of fail safe has been known (for example, PTL 1). In the motor of this type, when any system fails, the drive is continued by an electric power converter and the winding set in a normal system.

Incidentally, the motor of the EPS is mainly of a permanent magnet rotation type, and a powerful magnetic flux density needs to be obtained by a small permanent magnet configuring a rotor. For that reason, in the conventional art such as PTL 1, a neodymium magnet high in magnetic flux density is used as a permanent magnet.

A reduction in a coercive force of the neodymium magnet at high temperature has been known. The coercive force is a physical property of how a reverse magnetic field can be withstood without demagnetization when the reverse magnetic field is applied to the magnet. Hence, when a large current flows into the motor at high temperature, an excessive reverse magnetic field as compared with the coercive force is applied to the neodymium magnet, and the neodymium magnet is demagnetized (Irreversibly demagnetized). As a result, the characteristic of the motor changes with the result that a desired torque may not be obtained.

Hence, in the motor of the conventional art, a control needs to be performed to reduce an energizable maximum current at high temperature so that the neodymium magnet of the rotor is not demagnetized.

However, because the winding set of the motor is heated by energization, and the heat is radiated, the permanent magnet of the rotor is likely to become high temperature. In particular, the motor used for the EPS is likely to become high temperature by outputting an assist torque of continuous steering operation such as garage parking. Hence, in order to prevent the demagnetization of the neodymium magnet, a degree or a frequency of reducing a limit value of the energizable maximum current becomes high, resulting in a risk that a sufficient torque cannot be ensured. In particular, in the motor of the multiple systems as in PTL 1, it is a critical issue to ensure the torque of a normal system even at high temperature when a failure occurs in one system.

[PTL 1] JP-2011-78230 A (corresponding to US 2011/0074333)

SUMMARY

It is an object of the present disclosure to provide an EPS brushless motor having winding sets of multiple systems which easily ensures a torque at high temperature.

According to a first aspect of the present disclosure, a brushless motor for an electric power steering device that assists a steering operation, includes: a stator having a plurality of winding sets for a plurality of systems respectively; and a rotator having a ferrite magnet.

The neodymium magnet used for the rotor in the conventional art and the ferrite magnet used in the present disclosure are different in a change of a coercive force due to a temperature change from each other. Specifically, the coercive force of the neodymium magnet is reduced more as the temperature is higher whereas the coercive force of the ferrite magnet rises more as the temperature is higher. In other words, a maximum value of the applicable reverse magnetic field in a range where the magnet is not demagnetized becomes smaller as the temperature is higher in the neodymium magnet, and becomes larger as the temperature is higher in the ferrite magnet. In that example, the reverse magnetic field to be applied to the magnet is in proportion to a magnitude of the current flowing into the motor.

Therefore, in the above motor, a maximum current that can flow without any demagnetization at high temperature is large as compared with the conventional rotary electric machine using the neodymium magnet. Hence, the torque of the motor is easily ensured at high temperature. In particular, when a failure occurs in one system, it is easy to ensure the torque of the normal system even at high temperature.

According to a second aspect of the present disclosure, a motor control device that controls energization of the brushless motor according to the first aspect, includes: a plurality of inverters for the systems respectively, each of which corresponds to a winding set of a respective system, and supplies an alternating current to the winding set of the respective system; a current command value calculation device that calculates a dq-axis current command value for energizing the winding sets; a temperature estimation device that estimates temperature of the ferrite magnet; and a temperature rising control device that calculates a temperature rising dq-axis current command value, to be added to the dq-axis current command value, for flowing a temperature rising current in the winding sets when an estimated temperature is lower than a predetermined value.

The above motor control device performs a control for keeping a temperature of a ferrite magnet at a constant value or higher in order to prevent the ferrite magnet from being demagnetized at low temperature.

According to the above device, the ferrite magnet of the rotor can be warmed with the use of a heat generated in each winding set by allowing the temperature rising current to flow in each winding set, and the generation of demagnetization can be resultantly avoided. Therefore, the above brushless motor can ensure a stable torque over the high temperature to the low temperature while the ferrite magnet is used for the rotor.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereinafter, an electric power steering device (EPS) for a vehicle employing a brushless motor according to an embodiment of the present disclosure will be described with reference to the drawings.

First Embodiment

Steering System

Figure 2:
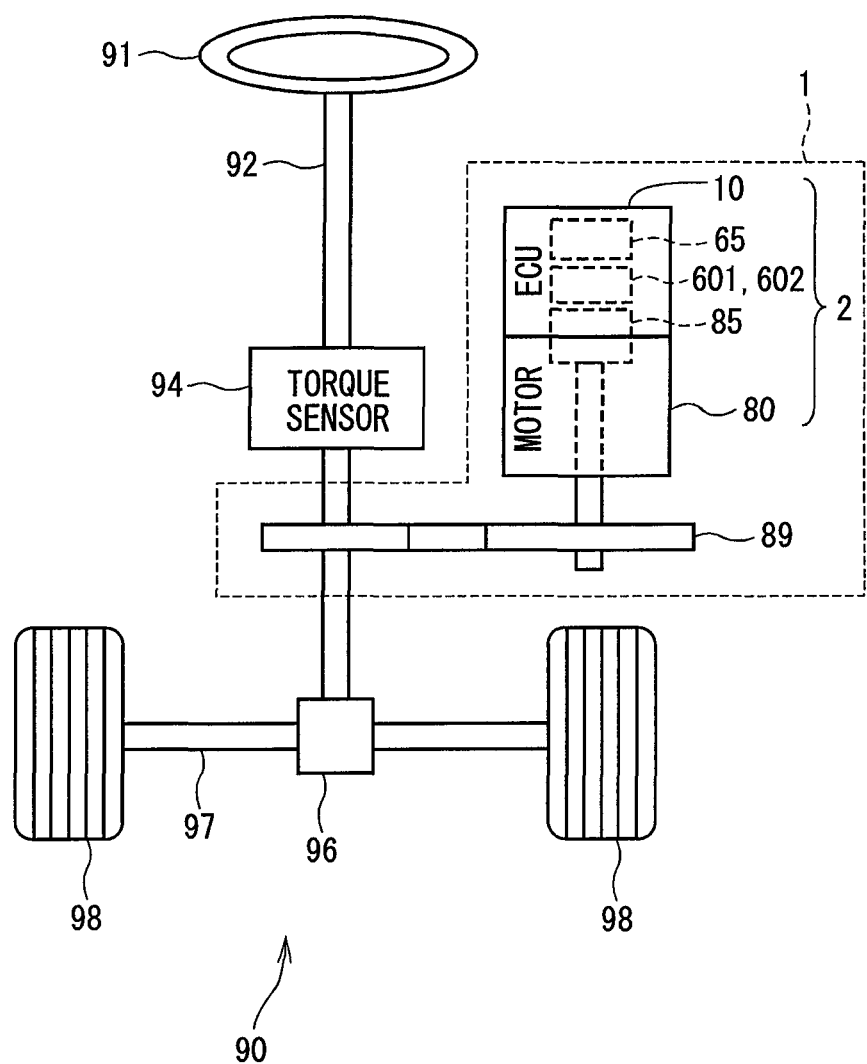
FIG. 2 is a schematic configuration view illustrating an electric power steering device employing the motor according to the first embodiment of the present disclosure.

FIG. 2 illustrates an overall configuration of a steering system 90 having an electric power steering device 1. A torque sensor 94 for detecting a steering torque is installed in a steering shaft 92 connected to a steering 91. A pinion gear 96 is disposed on a leading end of the steering shaft 92, and the pinion gear 96 is meshed with a rack shaft 97. A pair of wheels 98 is rotatably coupled with both ends of the rack shaft 97 through a tie rod. A rotational motion of the steering shaft 92 is converted into a linear motion of the rack shaft 97 by the pinion gear 96, and the pair of wheels 98 is steered at an angle corresponding to the linear motion displacement of the rack shaft 97.

The electric power steering device 1 includes a driver device 2 that rotates a rotating shaft and a reduction gear 89 that reduces the rotation of the rotating shaft and transmits the reduced rotation to the steering shaft 92.

The driver device 2 includes a motor 80 that generates a steering assist torque, and a control unit 10 that drives the motor 80. The motor 80 according to this embodiment is formed of a three-phase AC brushless motor, and rotates the reduction gear 89 forward and backward.

The control unit 10 includes a control unit 65 as a "motor control device" and inverters 601, 602 that control a power supply to the motor 80 according to a command from the control unit 65. The control unit 10 is also provided with a rotation angle sensor 85 that detects a rotation angle of the motor 80. The rotation angle sensor 85 includes, for example, a magnet which is magnetism generation device disposed on the motor 80 side, and a magnetism detection element disposed on the control unit 10 side. The rotation angle sensor 85 detects the rotation angle of a rotor of the motor 80, and converts the detected rotation angle into an electric angle $\theta$.

The control unit 65 performs the switching operation of the inverters 601 and 602 on the basis of a torque signal from the torque sensor 94 and a rotation angle signal from the rotation angle sensor 85, and controls the energization of the motor 80. With the above operation, the driver device 2 in the electric power steering device 1 generates a steering assist torque for assisting the steering of the steering 91, and transmits the steering assist torque to the steering shaft 92.

(Electric Configuration of Driver Device 2)

Figure 1:
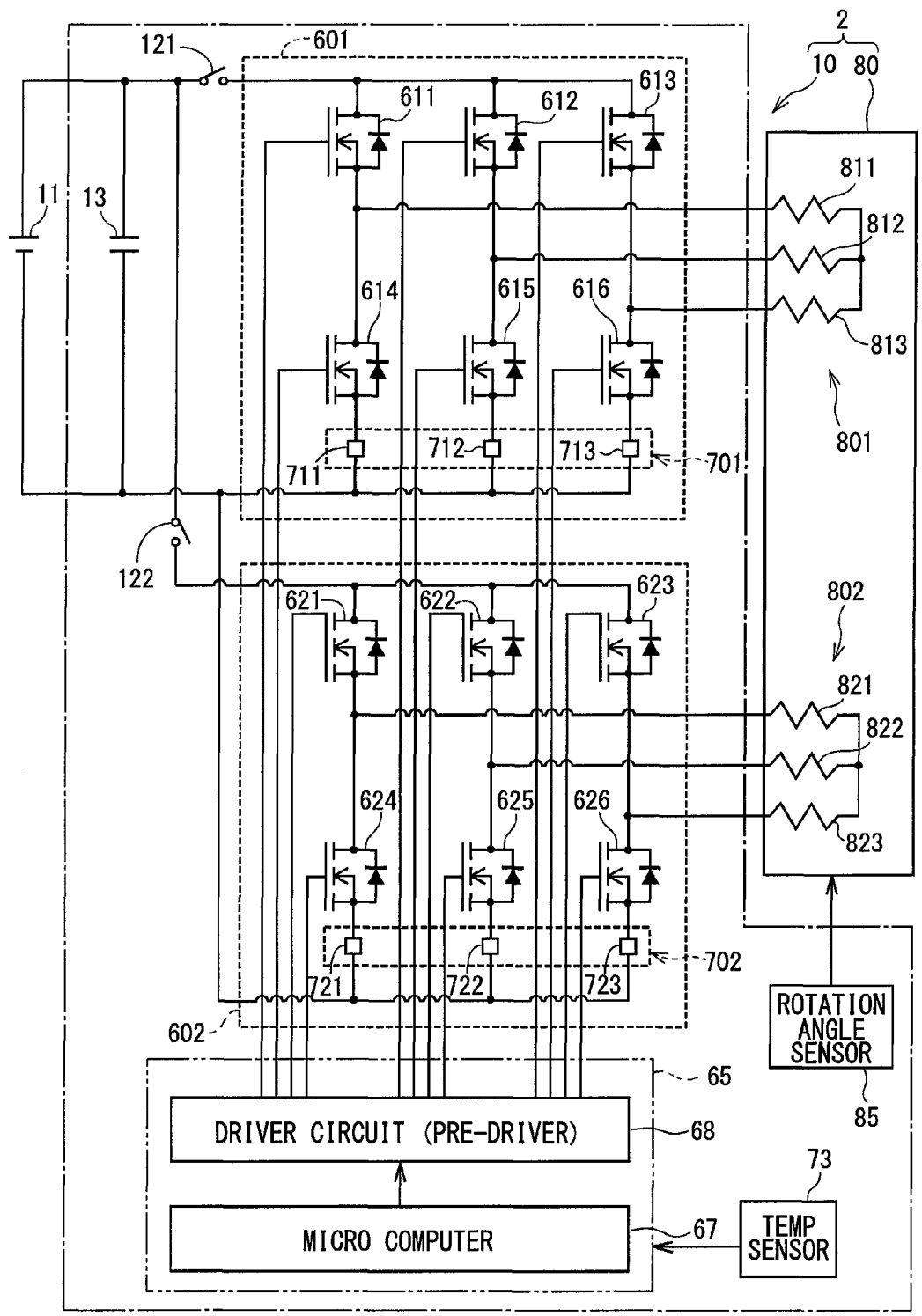
FIG. 1 is a circuit schematic view illustrating a motor according to a first embodiment of the present disclosure.

An electric configuration of the driver device 2 will be described with reference to FIG. 1.

The motor 80 has winding sets 801 and 802 of two systems. The first winding set 801 includes three-phase windings 811 to 813 of U, V, and W phases, and the second winding set 802 includes three-phase windings 821 to 823 of U, V, and W phases. The inverter 601 is disposed in correspondence with the first winding set 801, and the inverter 602 is disposed in correspondence with the second winding set 802. The inverters 601 and 602 are appropriately called "first inverter 601" and "second inverter 602".

Hereinafter, a unit of the combination of an inverter and the winding set corresponding to that inverter is called "system". In this embodiment, the combination of the first inverter 601 with the first winding set 801 is called "first system", and the combination of the second inverter 602 with the second winding set 802 is called "second system". The electric characteristics of the respective systems in the multiple systems are equivalent to each other. In symbols of components and physical quantities in each system, "1" is added to ends of the symbols in the first system, and "2" is added to ends of the symbols in the second system.

The control unit 10 includes power relays 121, 122, a capacitor 13, current sensors 701, 702, and a temperature sensor 73 in addition to the control unit 65, the inverters 601, 602, and the rotation angle sensor 85 described above.

The power relays 121 and 122 can block a power supply to the inverters 601 and 602 from a battery 11 for each of the systems.

The capacitor 13 is connected in parallel to the battery 11, stores electric charge, and assists the power supply to the inverters 601 and 602, and suppresses noise components such as a surge current.

The first inverter 601 includes six switching elements 611 to 616 connected in a bridge circuit, and switches the energization of the respective windings 811 to 813 of the first winding set 801. In this embodiment, the switching elements 611 to 616 are each formed of a MOSFET (metal oxide semiconductor field effect transistor). Hereinafter, the switching elements 611 to 616 are called "MOSs 611 to 616".

Drains of the MOSs 611 to 613 of an upper arm which is at a higher potential side are connected to a positive side of the battery 11. Sources of the MOSs 611 to 613 of the upper arm are connected to drains of the MOSs 614 to 616 of a lower arm which is at a lower potential side. Sources of the MOSs 614 to 616 of the lower arm are connected to a negative side of the battery 11. Connection points between the MOSs 611 to 613 of the upper arm and the MOSs 614 to 616 of the lower arm are connected to one ends of the windings 811 to 813, respectively.

The current sensors 701 and 702 detect phase currents to be supplied to the winding sets 801 and 802 by the inverters 601 and 602 for each of the phases. In an example of FIG. 1, three-phase currents are detected, but in another example, two-phase currents may be detected, and another one-phase current may be calculated through the Kirchhoff's law.

In the second inverter 602, the configurations of switching elements (MOSs) 621 to 626 and the current sensor 702 are identical with those in the first inverter 601.

The control unit 65 includes a microcomputer 67 and a driver circuit (pre-drivers) 68. The microcomputer 67 controls and calculates the respective calculated values associated with a control on the basis of input signals such as a torque signal and a rotation angle signal. The driver circuit 68 is connected to gates of the MOSs 611 to 616 and 621 to 626, and switchingly outputs signals to those gates on the basis of the control of the microcomputer 67.

The temperature sensor 73 is formed of a thermistor mounted on a substrate configuring, for example, the control unit 65, and detects a surrounding temperature. A detected temperature Ts detected by the temperature sensor 73 is input to the control unit 65, and used for subsequent control.

(Configuration of Motor 80)

Figure 3:
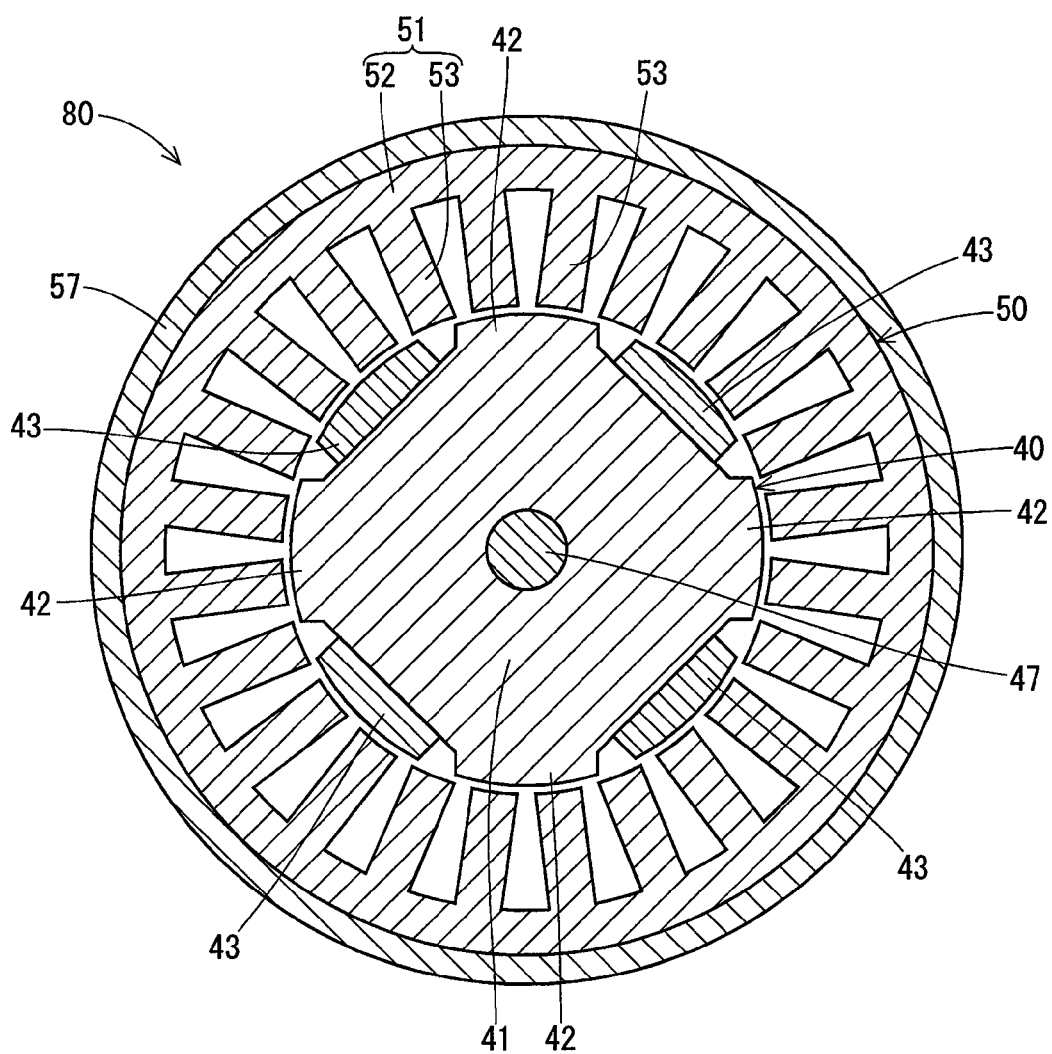
FIG. 3 is a cross-sectional view illustrating a motor portion of the motor according to the first embodiment of the present disclosure.

A configuration of the motor 80 will be described with reference to FIG. 3 in brief. As illustrated in FIG. 3, the motor 80 is of a permanent magnet rotation type, and includes a rotor 40, a stator 50, a casing 57, and a shaft 47.

The rotor 40 has a rotor core 41, multiple salient poles 42, and multiple magnet poles 43. The rotor core 41 and the salient poles 42 are made of a soft magnetic material, and the shaft 47 functioning as a rotating shaft is fixed to a center of the rotor core 41. The magnet poles 43 are each made of a permanent magnet, and disposed between the respective salient poles 42. All of the magnet poles 43 are disposed to have the same polarity located outside, and the salient poles 42 are magnetized in a polarity opposite to the polarity of the outside of the magnet poles 43.

This embodiment is characterized in that the permanent magnets configuring the magnet poles 43 are ferrite magnets. Hereinafter, the magnet poles 43 are called "ferrite magnets 43".

The stator 50 includes a cylindrical stator core 51 disposed outside of the rotor 40 in a radial direction, and the above-mentioned winding sets 801 and 802 wound around the stator core 51. The stator core 51 includes multiple teeth 53 whose leading ends face the rotor 40, and a yoke part 52 magnetically connecting the respective teeth 53 to each other outside in the radial direction. In FIG. 3, for prevention of complication, the winding sets 801 and 802 are omitted from illustration.

The casing 57 houses the rotor 40 and the stator 50 inside.

The shaft 47 passes through the rotor core 41 so as to extend along a rotating shaft center of the rotor 40, and is rotatable integrally with the rotor 40. One end side of the shaft 47 is connected to the reduction gear 89, and the other end side of the shaft 47 is provided with a magnet configuring the rotation angle sensor 85.

(Configuration of Control Unit 65)

Subsequently, the configuration of the control unit 65 will be described with reference to FIGS. 4 and 5.

Figure 4:
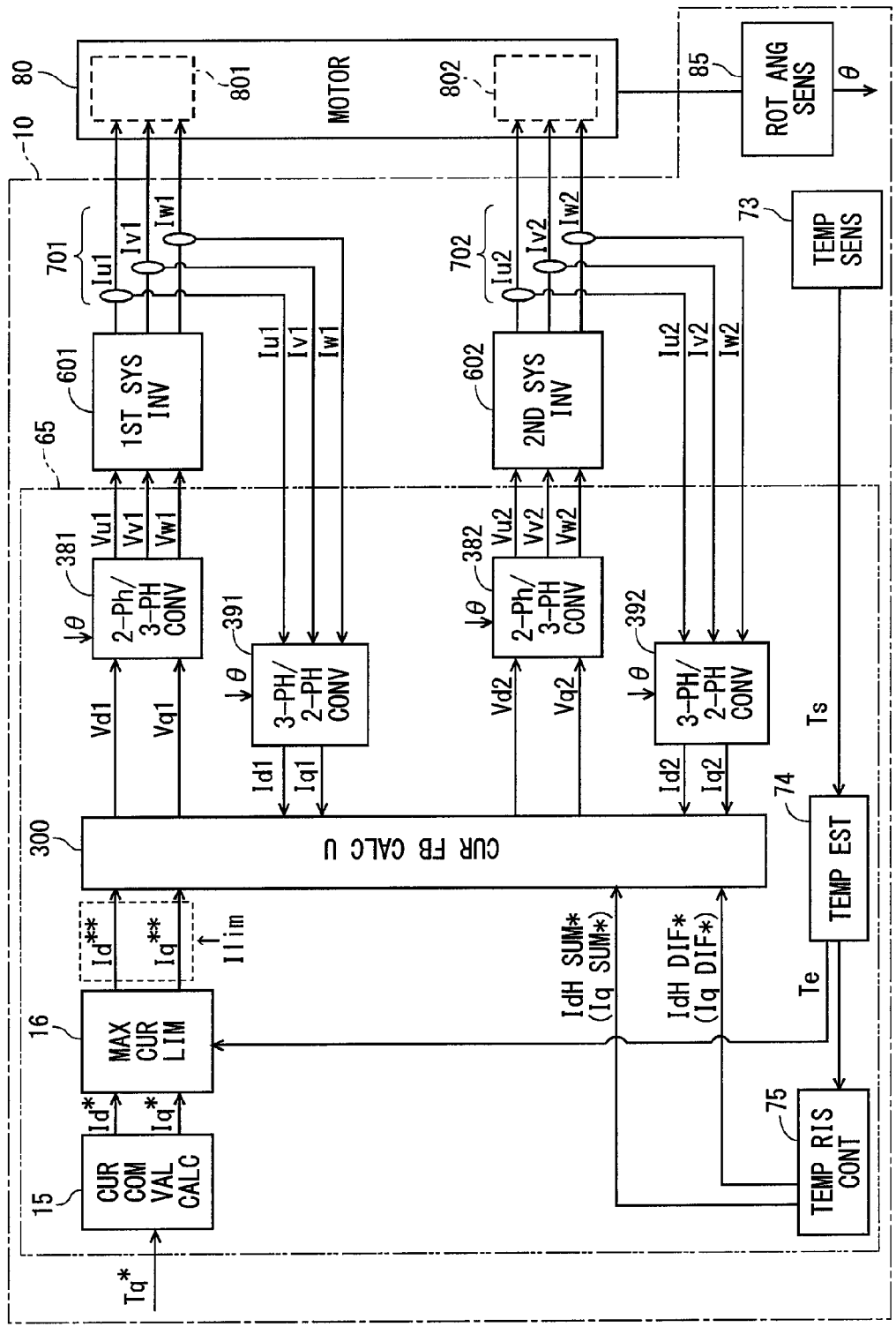
FIG. 4 is a block diagram illustrating a control unit of the motor according to the first embodiment of the present disclosure.

As indicated by a two-dot chain line in FIG. 4, the control unit 65 includes a current command value calculation unit 15, a maximum current limit unit 16, a current feedback calculation unit 300, two phase/three phase conversion units 381, 382, three phase/two phase conversion units 391, 392, a temperature estimation unit 74, and a temperature rising control unit 75.

The control unit 65 includes a configuration corresponding to each of the first system and the second system. In symbols of components and physical quantities corresponding to the respective systems, "1" is added to ends of the symbols in the first system, and "2" is added to ends of the symbols in the second system. Hereinafter, in the components corresponding to the first system and the second system, a configuration corresponding to the first system will be mainly described as a representative.

The current command value calculation unit 15 generates a d-axis current command value Id* which is a d-axis component and a q-axis current command value Iq* which is a q-axis component in a current to be supplied to the winding set 801, on the basis of an input signal such as a steering torque Tq* from the torque sensor 94. The d-axis is a direction parallel to an orientation of a magnetic flux generated by the rotor 40, and the q-axis is a direction orthogonal to the d-axis.

The maximum current limit unit 16 limits a maximum value of the current command value. When the dq-axis current command values Id* and Iq* calculated by the current command value calculation unit 15 exceed a maximum current limit value Ilim, the maximum current limit unit 16 outputs the dq-axis current command values Id and Iq corrected to the maximum current limit value Ilim. On the other hand, when the dq-axis current command values Id* and Iq* calculated by the current command value calculation unit 15 is equal to or lower than the maximum current limit value Ilim, the maximum current limit unit 16 outputs the current command values Id* and Iq* as they are as the current command values Id and Iq. A method of setting the maximum current limit value Ilim will be described later.

In the current feedback calculation unit 300 illustrated in FIG. 4, only input and output to the block will be described in brief. The current command values Id and Iq from the maximum current limit unit 16 are input to the current feedback calculation unit 300. Current detection values Id1, Iq1, Id2, and Iq2 converted by the three phase/two phase conversion units 391 and 392 in the respective systems are input to the current feedback calculation unit 300. Voltage command values Vd1, Vq1, Vd2, and Vq2 are output to the two phase/three phase conversion units 381 and 382 in the respective systems.

The three phase/two phase conversion unit 391 converts phase current detection values Iu1, Iv1, and Iw1 of three phases detected by the current sensor 701 into the d-axis current detection value Id1 and the q-axis current detection value Iq1 on the basis of the electric angle θ fed back from the rotation angle sensor 85.

The two phase/three phase conversion unit 381 converts the voltage command values Vd1 and Vq1 of two phases into three-phase voltage command values Vu1, Vv1, and Vw1 of the U-phase, the V-phase, and the W-phase on the basis of the electric angle θ fed back from the rotation angle sensor 85, and outputs the converted command values to the first inverter 601.

The inverter 601 performs the switching operation of the respective phase MOSs on the basis of duty signals corresponding to the three-phase voltage command values Vu1, Vv1, and Vw1, for example, under the PWM control. As a result, with the application of the commanded three-phase AC voltage to the motor 80, the motor 80 generates a desired assist torque.

The configuration of the three phase/two phase conversion unit 392 and the two phase/three phase conversion unit 382 corresponding to the second system is identical with the three phase/two phase conversion unit 391 and the two phase/three phase conversion unit 381 corresponding to the first system.

The temperature estimation unit 74 estimates a temperature of the ferrite magnets 43 on the basis of the detected temperature Ts input from the temperature sensor 73, and outputs an estimated temperature Te to the temperature rising control unit 75 and the maximum current limit unit 16. In order to calculate the estimated temperature Te of the ferrite magnets 43, the temperature estimation unit 74 may use the current detection values from not the temperature sensor 73 but the current sensors 701 and 702, or may use both of the temperature sensor 73 and the current sensors 701, 702.

The temperature rising control unit 75 performs "temperature rising control" for increasing the temperature of the ferrite magnets 43 on the basis of the input estimated temperature Te of the ferrite magnets 43. A description of the temperature rising control will be described later.

Figure 5:
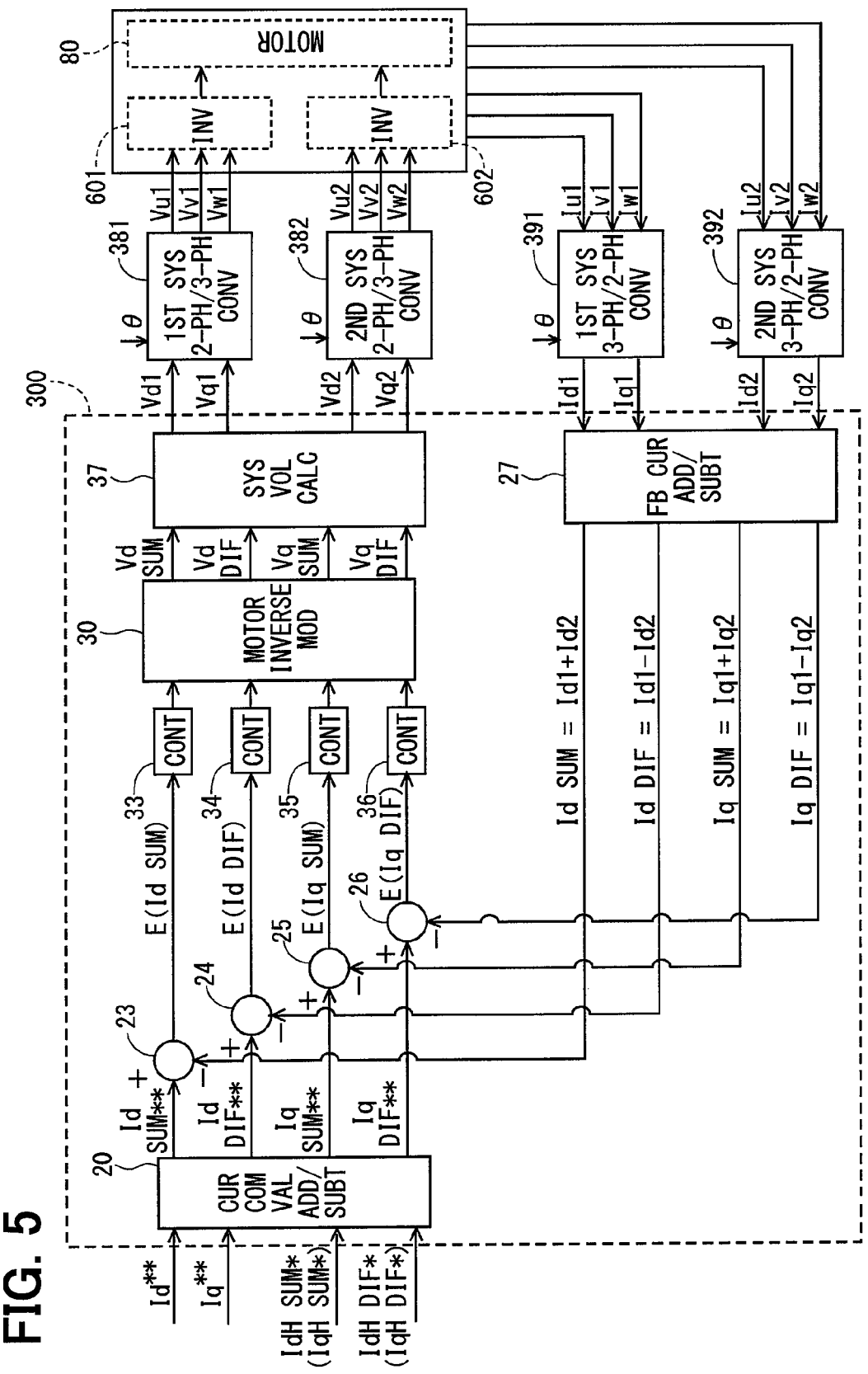
FIG. 5 is a block diagram illustrating the details of a current feedback calculation unit in FIG. 4.

FIG. 5 is a block diagram illustrating a configuration of a current feedback control. A portion indicated by a broken line block in FIG. 5 corresponds to the current feedback calculation unit 300 in FIG. 4.

The current feedback calculation unit 300 according to this embodiment controls "sum and difference of currents in the two systems". The detailed description of the control of "sum and difference of currents in the two systems" is disclosed in JP-A-2013-230019, and therefore an outline of a basic control will be described below.

A current command value addition/subtraction unit 20 converts the current command values Id* and Iq* output by the current command value calculation unit 15 into an Id sum and an Iq sum which are sums of the current command values in the two systems, and an Id difference and an Iq difference which are differences of the current command values in the two systems.

A feedback current addition/subtraction unit 27 converts current detection values Id1, Id2, Iq1, and Iq2 output by the three phase/two phase conversion units 391 and 392 into an Id sum, an Id difference, an Iq sum, and an Iq difference.

Deviation calculation units 23, 24, 25, and 26 calculate deviations between the current command values and the current detection values for the Id sum, the Id difference, the Iq sum, and the Iq difference, respectively. A Vd sum, a Vd difference, a Vq sum, and a Vq difference, which are sums/differences of the voltage command values, are calculated through controllers 33, 34, 35, and 36, and a motor inverse model 30 on the basis of deviations E(Id sum), E(Id difference), E(Iq sum), and E(Iq difference). A system voltage calculation unit 37 converts the Vd sum, the Vd difference, the Vq sum, and the Vq difference into the voltage command values Vd1, Vq1, Vd2, and Vq2 in the first system and the second system.

With the above configuration, the current feedback calculation unit 300 can control the inverters 601 and 602 of the two systems on the basis of "sum" and "difference" of the currents. The motor 80 generates the torque according to the sum of the currents to be input to the winding sets 801 and 802 of the two systems.

In the present specification, a state in which both of the inverters 601, 602 and the winding sets 801, 802 in the two systems are normal is called "two-system normal state", and a state in which the inverter or the winding set in any one system is in failure is called "one-system failure state". When a failure occurs in one system, the normal system continues the output of the torque.

The control unit 65 according to this embodiment performs a characteristic control described below in the two-system normal state.

(Current Limit)

In the two-system normal state, the maximum current limit unit 16 performs the current limit for preventing the demagnetization of the ferrite magnets 43.

Figure 6:
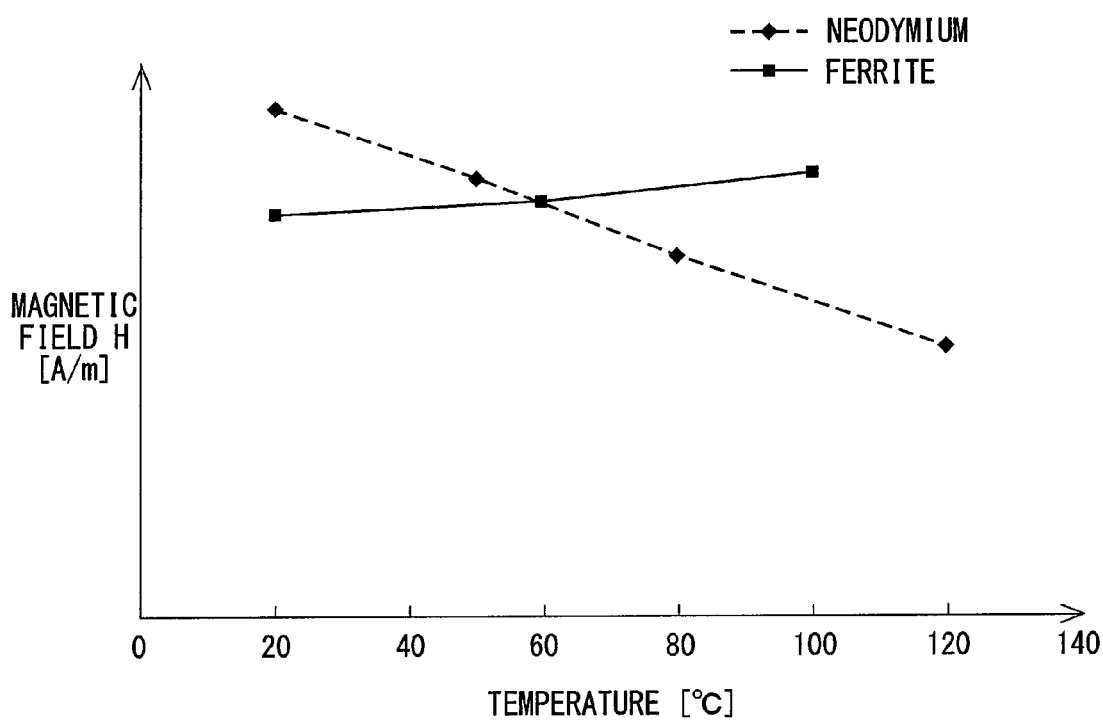
FIG. 6 is a characteristic diagram illustrating a relationship between a temperature and a coercive force in each of a neodymium magnet and a ferrite magnet.

FIG. 6 is a characteristic view illustrating a relationship between a temperature and a magnetic field (coercive force) H in each of the ferrite magnet and the neodymium magnet used for the permanent magnet in the rotor. The magnetic field H illustrated in FIG. 6 corresponds to a maximum value of a reverse magnetic field applicable without any demagnetization. As illustrated in FIG. 6, the magnetic field H is smaller as the temperature is lower in the ferrite magnet, and smaller as the temperature is higher in the neodymium magnet.

The reverse magnetic field to be applied to the ferrite magnets 43 becomes larger as a larger current flows into the winding sets 801 and 802 of the motor 80. As described above, the maximum value of the reverse magnetic field applicable without any demagnetization in the ferrite magnets 43 becomes smaller as the temperature is low. Under the circumstances, the maximum current limit unit 16 sets the maximum current limit value Ilim to be smaller as the estimated temperature Te is smaller so that the ferrite magnets 43 are not demagnetized, on the basis of the estimated temperature Te of the ferrite magnets 43 input from the temperature estimation unit 74 (refer to FIG. 7).

Figure 7:
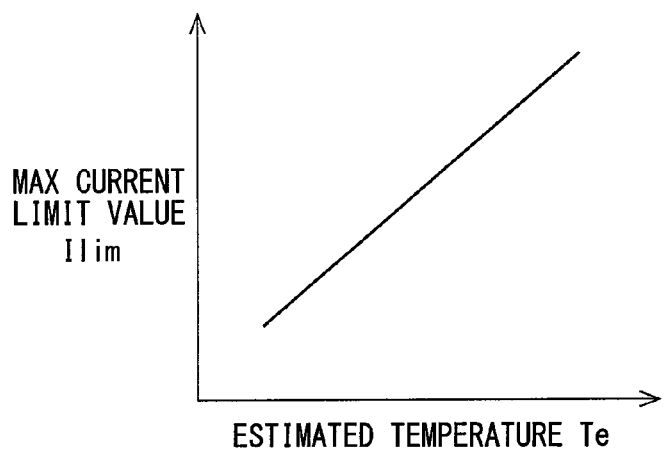
FIG. 7 is a graph illustrating an example of setting a maximum current limit value in a two-system normal state.

The graph illustrated in FIG. 7 is an example, and is not limited to a straight line, but may be changed stepwise every predetermined temperature.

(Temperature Rising Control)

In this embodiment, in the two-system normal state, the generation of the demagnetization is avoided by performing a temperature rising control for warming the ferrite magnets 43 of the rotor 40 with the aid of a heat generated when a phase current flows in the winding sets 801 and 802.

Now, as a comparative example, problems in the temperature rising control with the use of the motor having only the winding set and the inverter in one system will be described.

Figure 8:
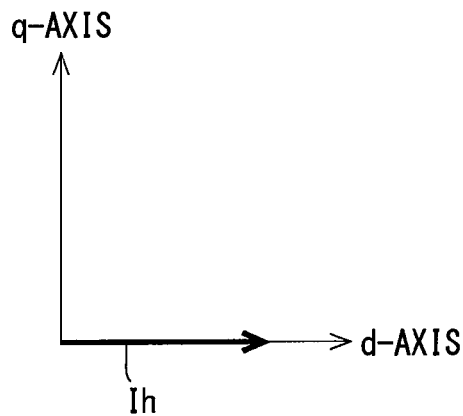
FIG. 8 is a dq coordinate vector diagram of a temperature rising current in a comparative example.

In the comparative example, when the temperature rising control of the magnet used for the rotor is performed, a temperature rising current Ih illustrated in FIG. 8 is allowed to flow in the winding set. The temperature rising current Ih has only the d-axis component. Hence, because the torque is not generated in the motor due to a temperature rising current which is not an original drive current, the motor is prevented from performing an unintended operation.

Figure 9:
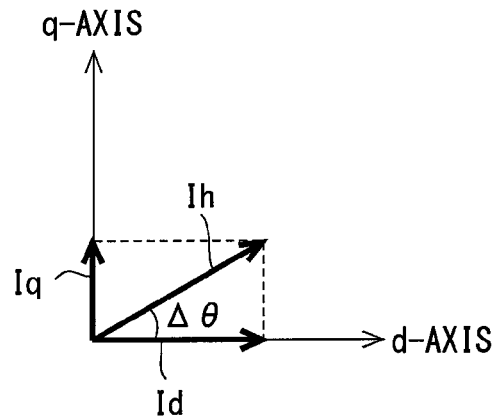
FIG. 9 is a dq coordinate vector diagram illustrating a case in which there is an electric angle error in an example illustrated in FIG. 8.

However, in the comparative example, when the electric angle error $\Delta\theta$ is present in the electric angle $\theta$ of the rotor, the temperature rising current Ih has not only the d-axis component Id but also the q-axis component Iq as illustrated in FIG. 9. In that case, an unintended torque is generated in the motor. In particular, in the case of the motor applied to the EPS, the steering may be moved against the driver's intention.

The temperature rising control according to this embodiment is to solve the above-mentioned problem with the comparative example.

Figure 10:
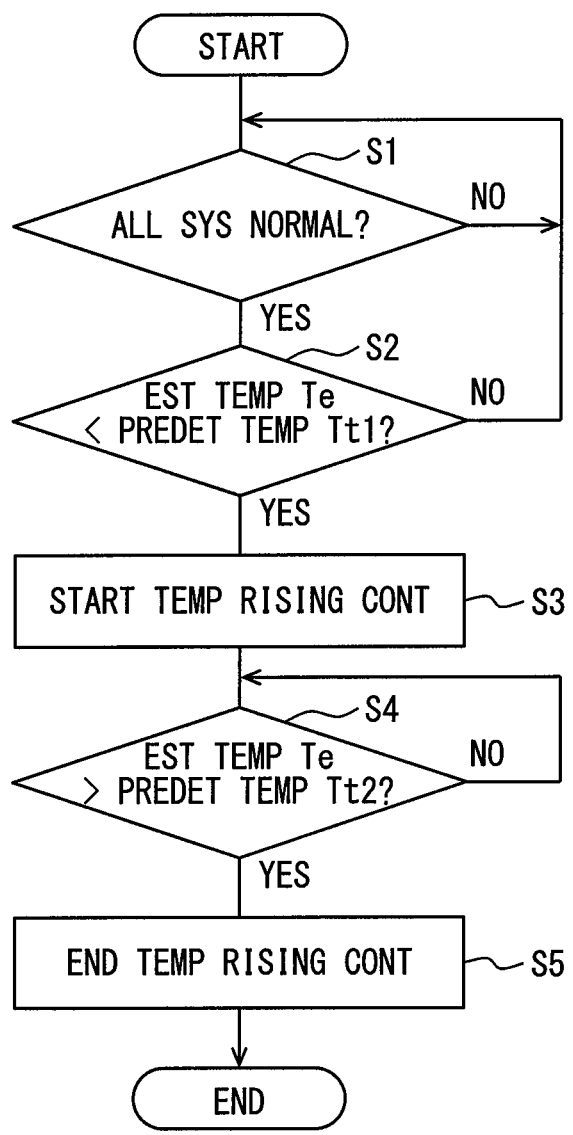
FIG. 10 is a flowchart illustrating a temperature rising control according to the first embodiment of the present disclosure.

First, the operation of the temperature rising control unit 75 according to this embodiment will be described with reference to a flowchart illustrated in FIG. 10. Hereinafter, symbol "S" means a step in the description of the flowchart.

In S1, the temperature rising control unit 75 determines whether each of the inverters 601, 602 and the winding sets 801, 802 in the two systems is normal, or not. For example, the temperature rising control unit 75 determines whether the phase current detection values Iu, Iv, and Iw detected by the current sensor 701 falls within a normal range from a predetermined lower limit value to a predetermined upper limit value, or not, thereby being capable of determining whether the inverter 601 or the first winding set 801 is in failure, or not. If it is determined that both of the two systems are normal (yes in S1), the temperature rising control unit 75 proceeds to S2. If it is determined that any one of the two systems is in failure (no in S1), the subsequent steps are not performed.

In S2, the temperature rising control unit 75 determines whether the estimated temperature Te of the ferrite magnets 43 input from the temperature estimation unit 74 is smaller than a first predetermined temperature Tt1, or not. If it is determined that the estimated temperature Te is smaller than the first predetermined temperature Tt1 (yes in S2), the temperature rising control unit 75 proceeds to S3, and starts the temperature rising control. On the other hand, if it is determined that the estimated temperature Te is equal to or larger than the first predetermined temperature Tt1 (no in S2), the temperature rising control unit 75 again returns to S1.

In S3, the temperature rising control unit 75 outputs a temperature rising current command value.

Figure 11:
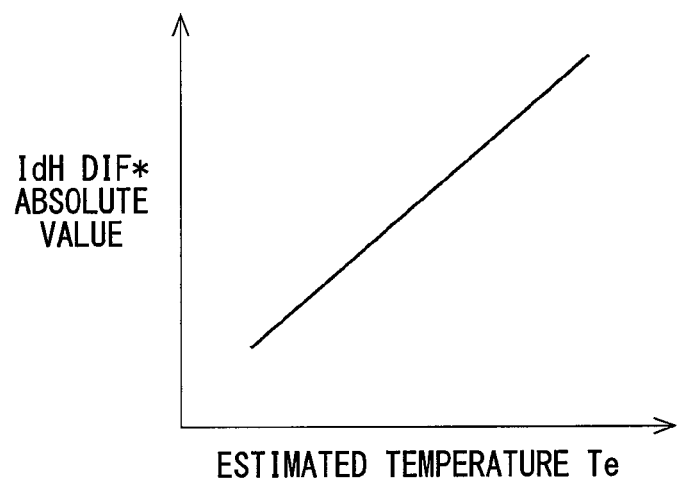
FIG. 11 is a graph illustrating an example of setting an absolute value of a d-axis current difference command.

As an example of the temperature rising current command value, the temperature rising control unit 75 calculates a d-axis current sum command IdH sum* and a d-axis current difference command IdH difference*, and outputs those calculated commands to the current feedback calculation unit 300 (refer to FIG. 4). In this example, the d-axis current sum command IdH sum*=0, and the d-axis current difference command IdH difference*≠0 are satisfied. In this case, an absolute value of the d-axis current difference command IdH difference* may be set to a smaller value for the purpose of preventing demagnetization as the estimated temperature Te of the ferrite magnets 43 is lower (refer to FIG. 11).

The d-axis current sum command IdH sum* and the d-axis current difference command IdH difference* are input to the current command value addition/subtraction unit 20 of the current feedback calculation unit 300 (refer to FIG. 5).

During steering assist, the current command value addition/subtraction unit 20 outputs a value obtained by adding the input d-axis current sum command IdH sum* to a sum of the d-axis current command values in the two systems as an Id sum**, and also outputs a value obtained by adding the input d-axis current difference command IdH difference* to a difference of the d-axis current command values in the two systems as an Id difference. As a result, a current in which the temperature rising current is added to the drive current of the motor 80 flows into the winding sets 801 and 802**.

The temperature rising control may not be performed during the steering assist. In that case, the current command value addition/subtraction unit 20 outputs the input d-axis current sum command IdH sum* as the Id sum**, and outputs the input d-axis current difference command IdH difference* as the Id difference**.

As indicated by parentheses in FIG. 4, as another example of the temperature rising current command value, the temperature rising control unit 75 may calculate a q-axis current sum command IqH sum* and a q-axis current difference command IqH difference*, and output those calculated values to the current feedback calculation unit 300. In that case, the q-axis current sum command IqH sum*=0 and the q-axis current difference command IqH difference*≠0 are satisfied. The other description is the same as that of the d-axis current sum command IdH sum* and the d-axis current difference command IdH difference*.

After the temperature rising control starts, the temperature rising control unit 75 determines whether the estimated temperature Te of the ferrite magnets 43 input from the temperature estimation unit 74 is higher than a second predetermined temperature Tt2, or not, in S4. The first predetermined temperature Tt1<the second predetermined temperature Tt2 is established.

If the temperature rising control unit 75 determines that the estimated temperature Te is larger than the second predetermined temperature Tt2 (yes in S4), the temperature rising control unit 75 terminates the temperature rising control (S5). On the other hand, if the temperature rising control unit 75 determines that the estimated temperature Te is equal to or smaller than the second predetermined temperature Tt2 (no in S4), the temperature rising control unit 75 repeats S4 while continuing the temperature rising control.

The above operation of the temperature rising control unit 75 is repetitively performed while the control unit 10 controls the motor 80.

Subsequently, a current flowing in the winding sets 801 and 802 under the temperature rising control will be described with reference to FIGS. 12 to 15.

In this embodiment, because two systems of the winding sets 801 and 802 are wound on the stator core 51, the rotation of the motor 80 is controlled according to the sum of the input currents to those winding sets 801 and 802. FIGS. 12 to 15 illustrate dq-axis coordinate vectors of a current flowing in the winding set 801 of the first system, a current flowing in the second winding set 802 of the second system, and the sum of currents flowing in the winding sets 801 and 802 of the two systems from the left.

Hereinafter, a description will be given of only the temperature rising current flowing according to the temperature rising current command value from the temperature rising control unit 75 for simplifying the description of features of the temperature rising control according to this embodiment.

First, examples in which the temperature rising current command value is the d-axis current sum command IdH sum* (=0) and the d-axis current difference command IdH difference* (≠0) will be described with reference to FIGS. 12 and 13.

The d-axis current sum command IdH sum* and the d-axis current difference command IdH difference* are calculated for the purpose of setting the temperature rising currents IdH1, IqH1 flowing in the first system, and the temperature rising currents IdH2, IqH2 flowing in the second system to IdH1=a, IqH1=0, IdH2=−a, and IqH2=0 (a≠0). Temperature rising currents Ih1 and Ih2 illustrated in FIG. 12 flow in the winding sets 801 and 802 of the respective systems according to the temperature rising current command value.

Figure 12:
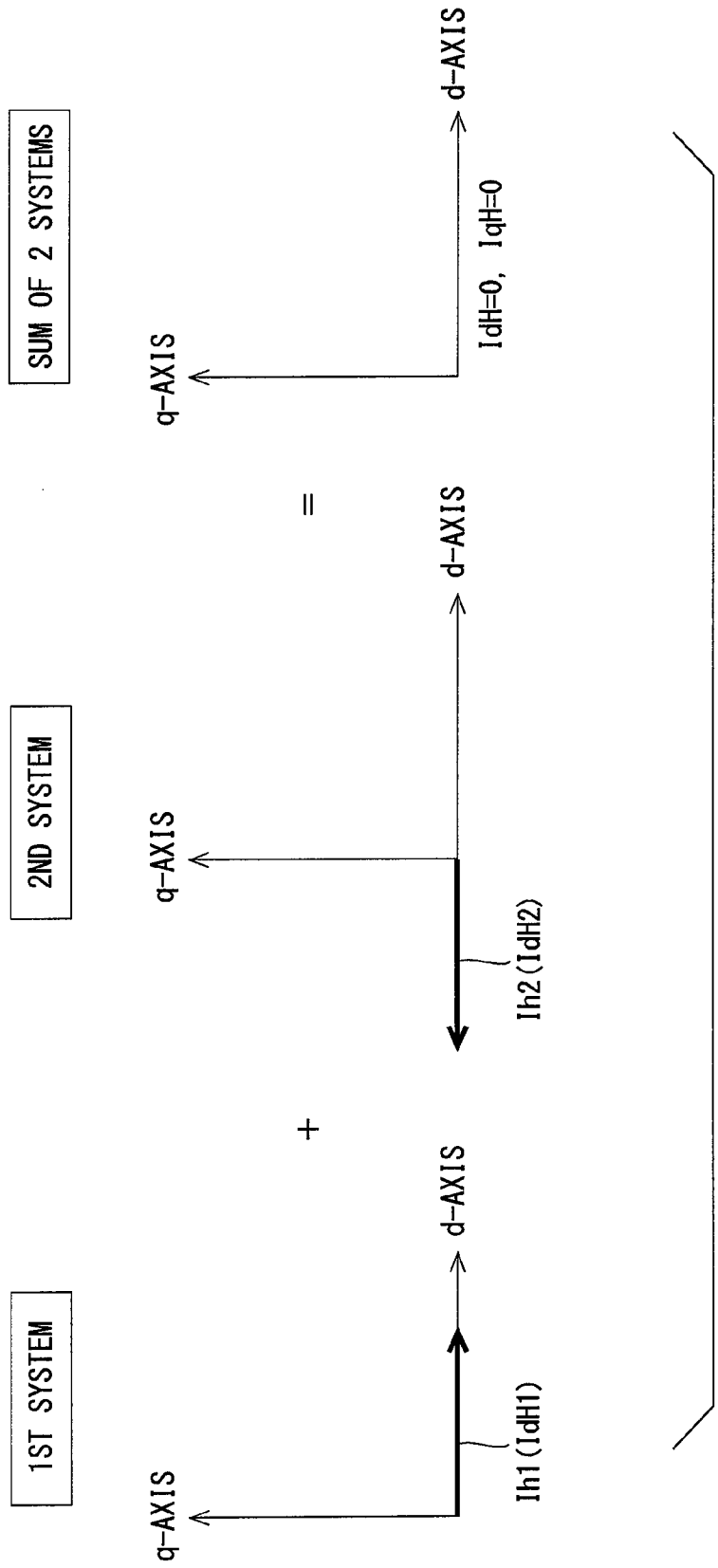
FIG. 12 is a dq coordinate vector diagram of an example of a temperature rising current according to the first embodiment of the present disclosure.

As illustrated in FIG. 12, temperature rising d-axis currents IdH1 and IdH2 opposite in positive and negative to each other flow in the winding sets 801 and 802 of the respective systems. With that operation, the winding sets 801 and 802 generate heat. The sum of the temperature rising d-axis currents in the two systems is IdH1+IdH2=0.

On the other hand, the temperature rising q-axis currents IqH1 and IqH2 do not flow in the winding sets 801 and 802 of the respective systems, and the sum of the temperature rising q-axis currents in the two systems is IqH1+IqH2=0. For that reason, no torque is generated in the motor 80.

Figure 13:
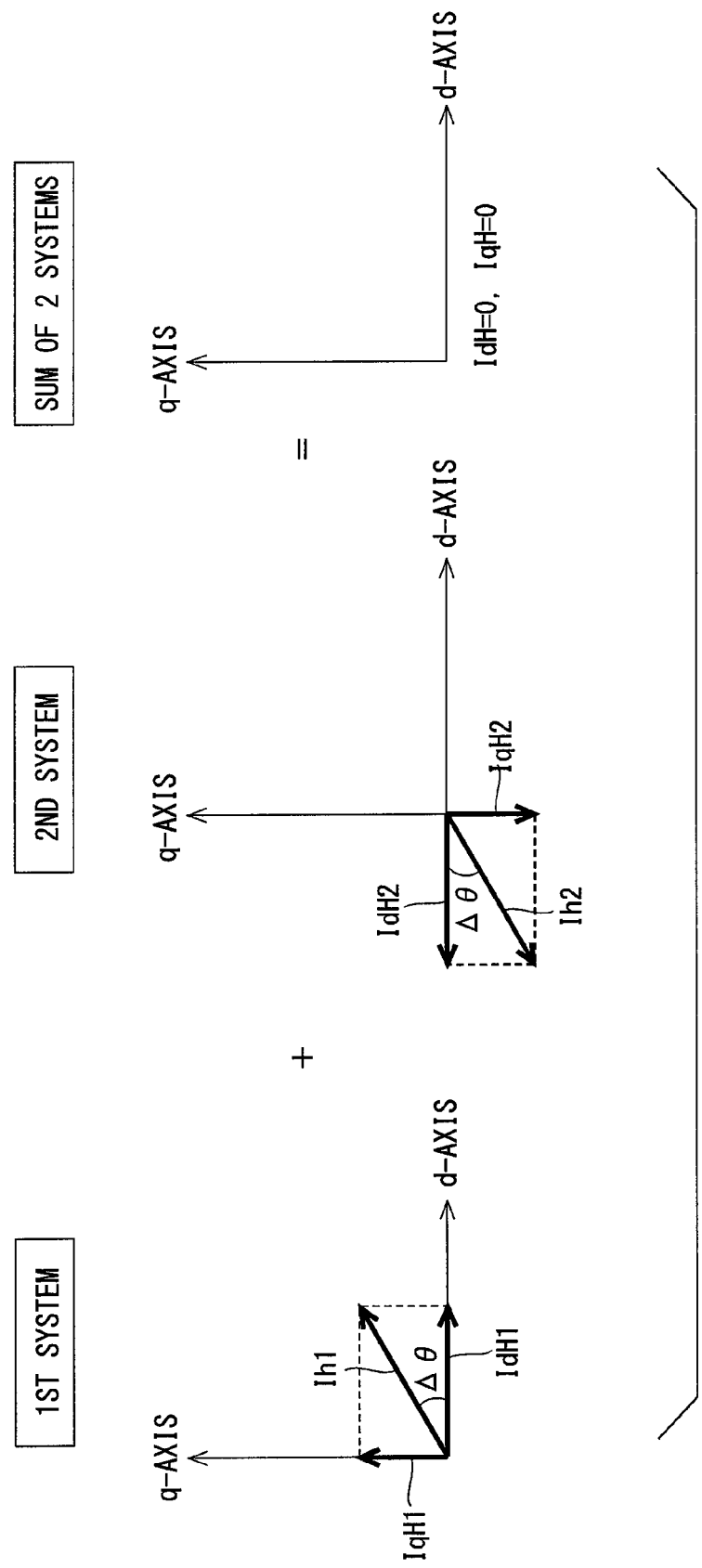
FIG. 13 is a dq coordinate vector diagram illustrating a case in which there is an electric angle error in an example illustrated in FIG. 12.

In the example of FIG. 12, a case in which the electric angle error Δθ is present at a rotational position of the rotor 40 is illustrated in FIG. 13. In that case, as illustrated in FIG. 13, the temperature rising currents Ih1 and Ih2 having the d-component and the q-component flow. In other words, even if the temperature rising current command values are calculated so as to set the temperature rising q-axis currents IqH1 and IqH2 of the respective systems to 0, IqH1 and IqH2≠0 is met.

However, a control is originally made so that the sum of the temperature rising dq-axis currents in the two systems becomes 0. For that reason, even if the electric angle error Δθ is present, the sum of the temperature rising q-axis currents in the two systems is IqH1+IqH2=0, and no torque is generated in the motor 80.

Figure 14:
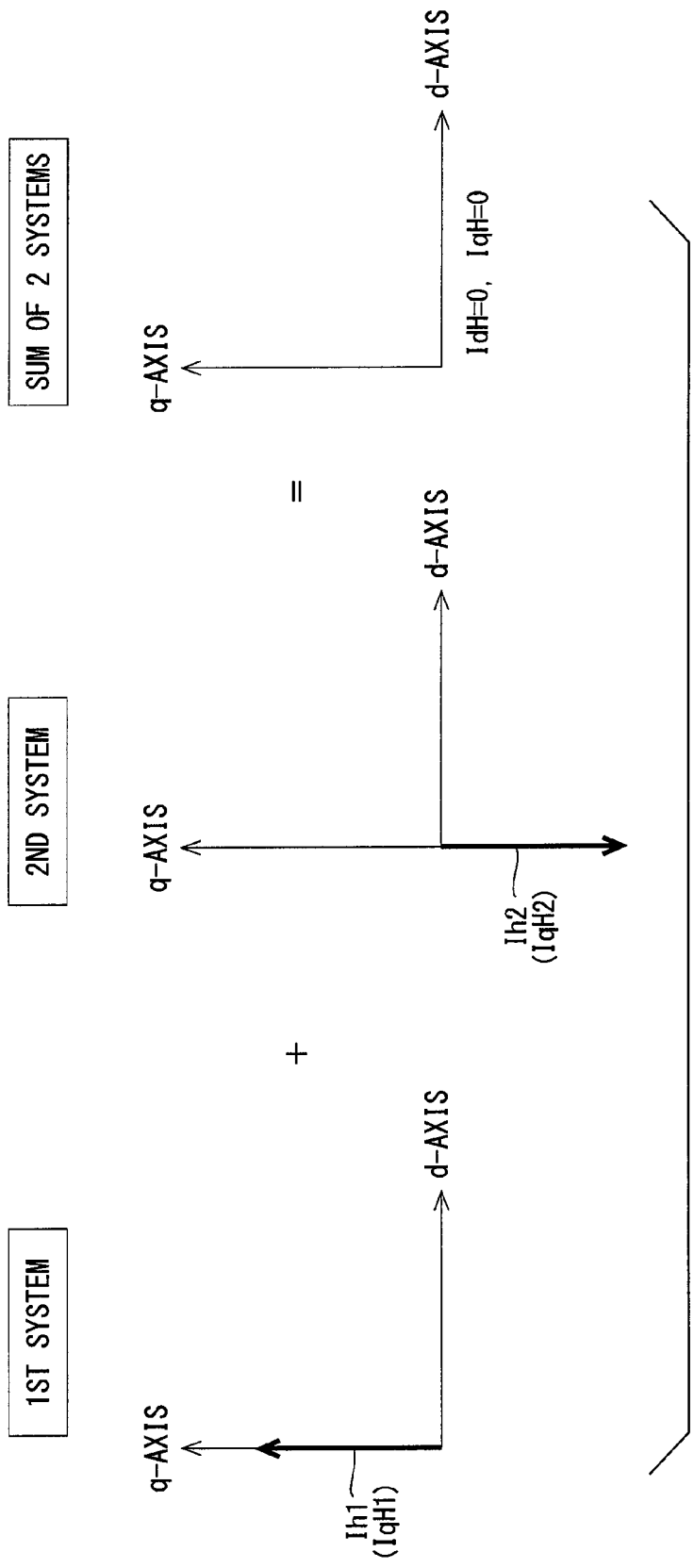
FIG. 14 is a dq coordinate vector diagram of another example of a temperature rising current according to the first embodiment of the present disclosure.
Figure 15:
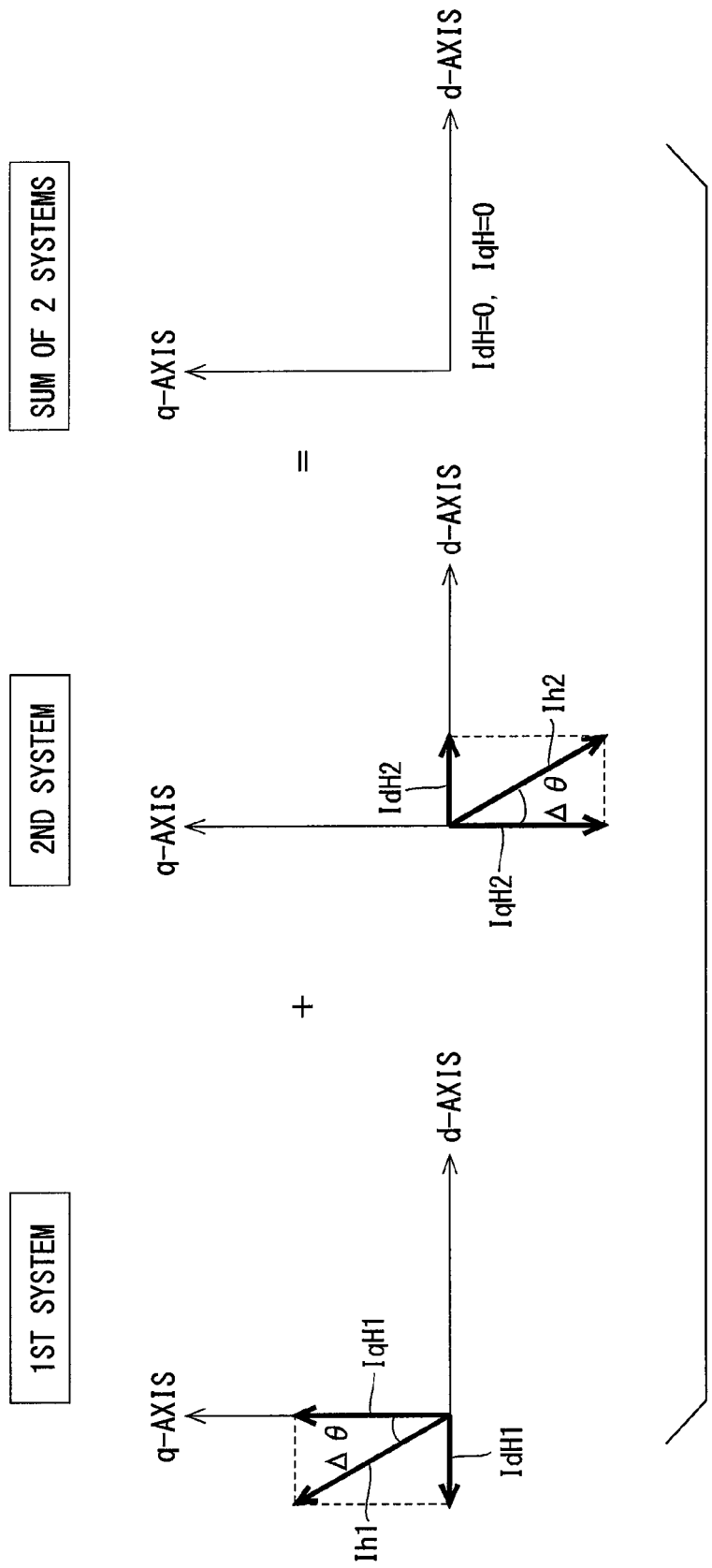
FIG. 15 is a dq coordinate vector diagram illustrating a case in which there is an electric angle error in an example illustrated in FIG. 14.

Then, examples in which the temperature rising current command value is the q-axis current sum command IqH sum* (=0) and the q-axis current difference command IqH difference* (≠0) will be described with reference to FIGS. 14 and 15.

In this example, the same description is applied by merely replacing the dq-axis in the above example. In other words, as illustrated in FIG. 14, the temperature rising currents Ih1 and Ih2 in which the temperature rising q-axis current sum and the temperature rising d-axis current sum are 0 flow in the winding sets 801 and 802 of the respective systems. Even if the electric angle error Δθ is present, the temperature rising q-axis current sum is 0 as illustrated in FIG. 15, and no torque is generated in the motor 80.

If there is no need to consider the electric angle error Δθ, when the temperature rising current command value is calculated taking only that the sum of the temperature rising q-axis currents in the two systems is set to 0 into consideration, the temperature rising control can be performed without generation of the torque in the motor 80.

In the above embodiment, as a more preferable mode, the sum of the temperature rising d-axis currents and the sum of the temperature rising q-axis currents in the two systems are controlled to be 0. With that control, even if the electric angle error Δθ is present, because the sum of the temperature rising q-axis currents always becomes 0, the temperature rising control can be performed without generation of the torque in the motor 80.

The above examples of the temperature rising current command values may be combined together. In other words, the temperature rising control unit 75 may output the d-axis current sum command IdH sum*, the d-axis current difference command IdH difference*, the q-axis current sum command IqH sum*, and the q-axis current difference command IqH difference*.

(Advantages)

(1) The motor 80 according to this embodiment is applied to the electric power steering device 1 that assists steering, and includes the stator 50 having the winding sets 801 and 802 in the multiple systems, the rotor 40 having the ferrite magnets 43, and the inverters 601 and 602 in the multiple systems which are disposed in correspondence with the winding sets 801 and 802, and output an AC current to the corresponding winding sets.

As described above, a change in the magnetic field H of the ferrite magnets 43 to a change in temperature is opposite to that of the neodymium magnet. In other words, the magnetic field H of the ferrite magnets 43 is smaller as the temperature is lower, and larger as the temperature is higher (refer to FIG. 6). For example, in a graph illustrated in FIG. 6, the ferrite magnet is larger in the magnetic field H than the neodymium magnet in a range of about 60 degrees or higher.

For that reason, in the motor 80 according to this embodiment, the maximum current that can flow without any demagnetization at high temperature is large as compared with the conventional rotary electric machine using the neodymium magnet. Hence, the torque of the motor 80 is easily ensured at high temperature. In particular, in the one-system failure state, it is easy to ensure the torque of the normal system even at high temperature.

The ferrite magnet contains iron oxide as a main raw material, and is inexpensive as compared with the neodymium magnet that contains a rare earth as the main raw material. As a result, the motor 80 according to this embodiment can reduce the cost as compared with the conventional art.

(2) The control unit 65 for controlling the energization of the motor 80 according to this embodiment includes: the current command value calculation unit 15 for calculating a dq-axis current command value for energizing the winding sets 801 and 802; the temperature estimation unit 74 for estimating the temperature of the ferrite magnet 43; and the temperature rising control unit 75 for calculating the temperature rising dq-axis current command value to be added to the dq-axis current command value for allowing the temperature rising current to flow in the winding sets 801 and 802 when the estimated temperature Te is lower than the predetermined temperature Tt1.

With the above configuration, the winding sets 801 and 802 are energized by the temperature rising current to generate heat, and the generated heat enables the ferrite magnets 43 of the rotor 40 to be warmed. Hence, the demagnetization can be avoided from being generated in the ferrite magnets 43.

(3) The temperature rising control unit 75 according to this embodiment sets the temperature rising dq-axis current command value so that the q-axis sums of the temperature rising currents in all of the systems become 0. With the above setting, the temperature rising control can be performed without generation of the torque in the motor 80.

The temperature rising control unit 75 according to this embodiment sets the temperature rising dq-axis current command value so that the d-axis sums and the q-axis sums of the temperature rising currents in all of the systems become 0. With the above setting, even if the electric angle error Δθ is present, the temperature rising control can be performed without generation of the torque in the motor 80.

(4) The control unit 65 according to this embodiment further includes the maximum current limit unit 16 that limits the dq-axis current command value, and the maximum current limit unit 16 decreases the maximum current limit value Ilim of the dq-axis current command value more as the estimated temperature Te estimated by the temperature estimation unit 74 is lower.

With the above configuration, the ferrite magnets 43 can be prevented from being demagnetized by allowing an excessive current to flow in a low temperature state.

Second Embodiment

Figure 16:
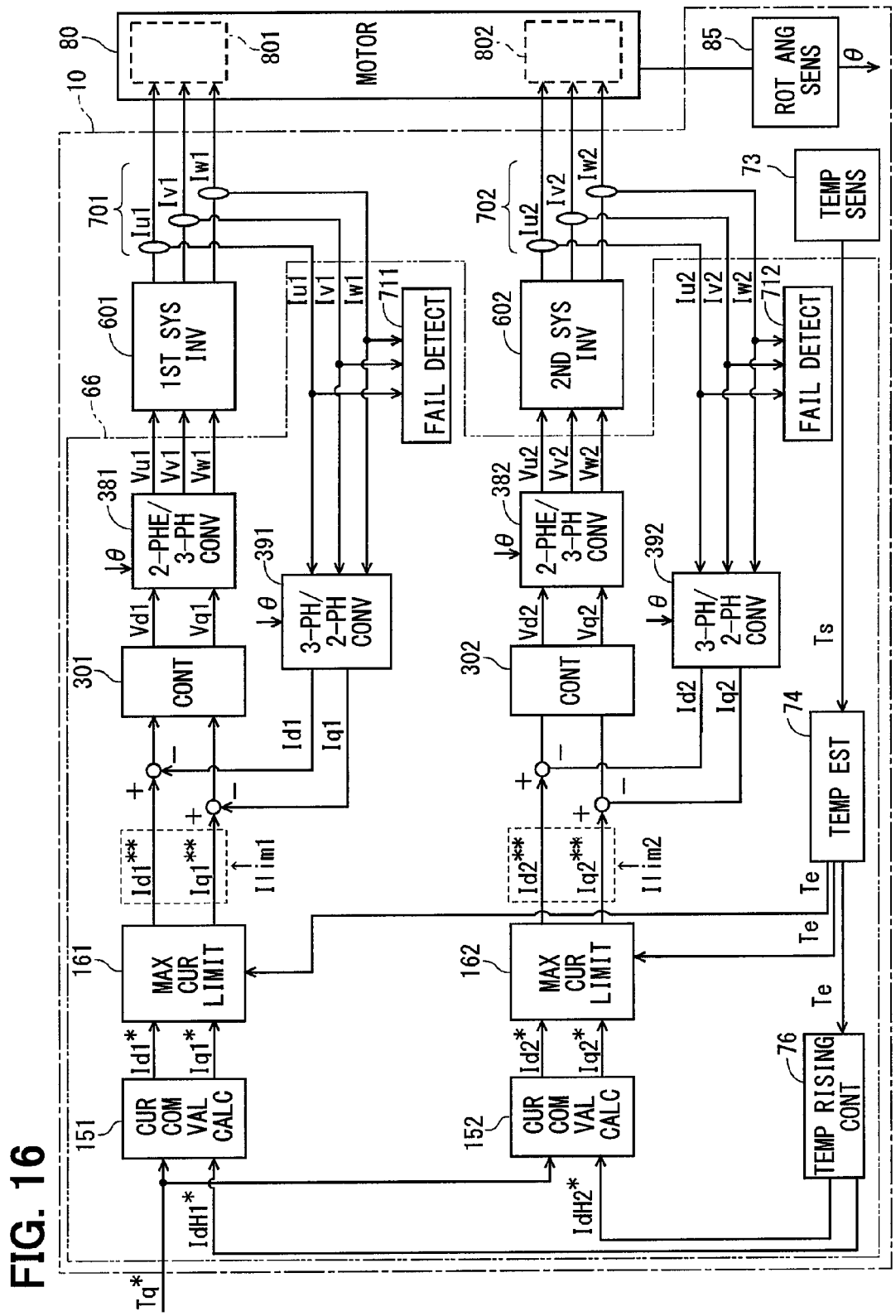
FIG. 16 is a block diagram illustrating a control unit of a motor according to a second embodiment of the present disclosure.

A second embodiment of the present disclosure will be described with reference to FIGS. 16 and 17. In the second embodiment, substantially the same components as those in the first embodiment are denoted by identical symbols, and their repetitive description will be omitted.

A control unit 66 according to the second embodiment includes current command value calculation units 151, 152, maximum current limit units 161, 162, three phase/two phase conversion units 391, 392, controllers 301, 302, two phase/three phase conversion units 381, 382, failure detection units 711, 712, a temperature estimation unit 74, and a temperature rising control unit 76.

The control unit 66 includes a configuration corresponding to each of the first system and the second system as in the first embodiment. In symbols of components and physical quantities corresponding to the respective systems, "1" is added to ends of the symbols in the first system, and "2" is added to ends of the symbols in the second system.

The current command value calculation unit 151 calculates a d-axis current command value Id1* and a q-axis current command value Iq1* on the basis of an input signal such as a steering torque Tq* from a torque sensor 94.

The maximum current limit unit 161 limits the dq-axis current command values Id1* and Iq1* to a maximum current limit value Ilim1 or lower, and outputs the current command values Id1 and Iq1.

The controller 301 receives current deviations between the dq-axis current command values Id1, Iq1 and the dq-axis current detection values Id1, Iq1, and calculates the voltage command values Vd1 and Vq1 through PI (proportional integral) control calculation so that the current deviations become 0.

The failure detection unit 711 determines whether the phase current detection values Iu, Iv, and Iw detected by the current sensor 701 falls within a normal range from a predetermined lower value to a predetermined upper limit value, or not, thereby detecting a failure in the first inverter 601 or the first winding set 801.

The configurations of the current command value calculation unit 152, the maximum current limit unit 162, the controller 302, and the failure detection unit 712 in the second system are identical with the configurations of the current command value calculation unit 151, the maximum current limit unit 161, the controller 301, and the failure detection unit 711 in the first system.

With the above configuration, the control unit 66 according to the second embodiment subjects the respective currents of the two systems to feedback control.

(Control in One-System Failure State)

The control unit 66 according to the second embodiment performs a characteristic control described below in the one-system failure state. Hereinafter, a case in which "the first system is in failure, and the second system is normal" is assumed.

First, the failure detection unit 711 detects a failure in the inverter 601 or the first winding set 801 on the basis of the phase current detection values Iu1, Iv1, and Iw1 detected by the current sensor 701, and the input voltage Vu1 of the inverter 601.

Upon detecting the failure in the first system, the failure detection unit 711 stops the output to the inverter 601. As a method of stopping the output, the current command values Id1* and Iq1* commanded by the current command value calculation unit 151, or the maximum current limit value set by the maximum current limit unit 161 may be set to 0. All of the drive signals to the MOSs 611 to 616 from the driver circuit 68 may be turned off. Alternatively, if there is no possibility of re-energization, the power relay 121 disposed on the power line of the inverter 601 may be blocked on the circuit.

The control unit 66 continues the drive of the motor 80 in only the normal second system. With the operation of the normal system as described above, when one system is in failure, the steering assist function can be prevented from being completely lost.

By the way, as disclosed in JP-A-2013-48524 in detail, when the output to the inverter 601 in the failure system stops because of a short-circuit failure, the inverter 602 in the normal system drives the motor 80, or a driver steers the steering shaft 92 to rotate the motor 80 from a load side, as a result of which a reverse voltage is generated in the inverter 601 of the failure system. The reverse voltage causes a break torque against the drive to be generated in the motor 80.

The short-circuit failure means a state in which any line in the failure system is rendered conductive against a control intended to render the line nonconductive.

When the break torque is generated in the case of short-circuit failure, a maximum torque of the motor 80 is reduced. Under the circumstances, in order to compensate the break torque, a larger current than that in the normal drive state is required to flow in the inverter 602 of the normal system.

Therefore, when the short-circuit failure is detected, the control unit 66 according to the second embodiment controls the normal system so as to compensate the break torque. The detail is disclosed in JP-A-2013-48524, and therefore its description will be omitted.

That, in the ferrite magnets, the magnetic flux density decreases more as the temperature increases more has been known. An influence of that phenomenon on a reduction in the torque is particularly large when the drive of the motor 80 is continued by only the normal system.

Hence, in the second embodiment, in controlling the normal system so as to compensate the break torque, a control is performed paying attention to a reduction in the magnetic flux density due to the temperature rising of the ferrite magnets 43. In other words, the control unit 66 increases a current flowing in the normal system to the degree that the magnetic flux density decreases, on the basis of the temperature rising of the ferrite magnets 43, to thereby effectively compensate the break torque of the motor 80.

For example, when the failure detection unit 711 detects the short-circuit failure of the first system, the maximum current limit unit 162 of the second system changes the setting of a maximum current limit value Ilim2 on the basis of the estimated temperature Te of the ferrite magnets 43 which is input from the temperature estimation unit 74. In that situation, the maximum current limit value Ilim2 is set to be larger as the estimated temperature Te of the ferrite magnets 43 is higher as illustrated in FIG. 17. With the above setting, the current value flowing in the inverter 602 of the normal system increases more as the temperature of the ferrite magnets 43 increases more.

Figure 17:
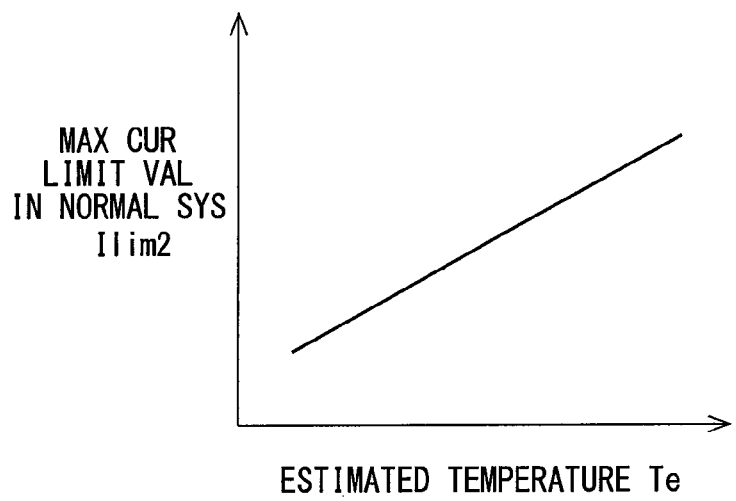
FIG. 17 is a graph illustrating an example of setting a maximum current limit value in a normal system at the time of one-system failure.

The "Ilim2" indicated by the axis of ordinate in FIG. 17 corresponds to the maximum current limit value of the normal system in the one-system failure state, and the maximum current limit value Ilim1 of the first system when the second system is in failure is set in the same manner. The graph illustrated in FIG. 17 is an example, and is not limited to a straight line, but may be changed stepwise every predetermined temperature.

(Current Limit)

In the second embodiment, as in the first embodiment, in the two-system normal state, the maximum current limit units 161 and 162 set the maximum current limit values Ilim1 and Ilim2 so that the ferrite magnets 43 are not demagnetized, on the basis of the estimated temperature Te of the ferrite magnets 43 input from the temperature estimation unit 74. A method of setting the maximum current limit values Ilim1 and Ilim2 is the same as the method of setting the maximum current limit value Ilim in the first embodiment.

(Temperature Rising Control)

Similarly to the first embodiment, in the second embodiment, in the two-system normal state, the temperature rising control unit 76 according to the second embodiment performs the "temperature rising control" for increasing the temperature of the ferrite magnets 43, on the basis of the input estimated temperature Te of the ferrite magnets 43, as in the temperature rising control unit 75 according to the first embodiment. The operation of the temperature rising control unit 76 is the same as that in the first embodiment.

As the temperature rising current command value, the temperature rising control unit 76 outputs the temperature rising d-axis current command value IdH1* to the current command value calculation unit 151, and outputs the temperature rising d-axis current command value IdH2* to the current command value calculation unit 152. In this example, the temperature rising d-axis current command values IdH1* and IqH2* are values opposite in positive and negative to each other, and whose sum is 0.

The current command value calculation unit 151 outputs a value obtained by adding the input temperature rising d-axis current command value IdH1* to the calculated command value as the d-axis current command value Id1*. The current command value calculation unit 152 outputs a value obtained by adding the input temperature rising d-axis current command value IdH2* to the calculated command value as the d-axis current command value Id2*.

With the above configuration, the same temperature rising currents Ih1 and Ih2 as those in the example illustrated in FIG. 12 flow in the winding sets 801 and 802. Hence as in the first embodiment, even if the electric angle error Δθ is present, because the sum of the temperature rising q-axis currents always becomes 0, the temperature rising control can be performed without generation of the torque in the motor 80.

When the temperature rising control unit 76 outputs the temperature rising q-axis current command values IqH1* and IqH2* as the temperature rising current command values, the same description is applied with the replacement of dq-axis. The temperature rising d-axis current command values IdH1*, IdH2*, and the temperature rising q-axis current command values IqH1*, IqH2* may be combined together.

(Advantages)

(1) As described above, the control unit 66 according to the second embodiment further includes the failure detection units 711 and 712 for detecting the short-circuit failure in which the break torque is generated for the inverters 601, 602 and the winding sets 801, 802. When the short-circuit failure of the inverters 601, 602 or the winding sets 801, 802 is detected by the failure detection units 711 and 712, the control unit 66 stops the output of the inverter in the failure system, and controls the output of the inverter in the normal system so as to compensate the break torque.

Figure 18:
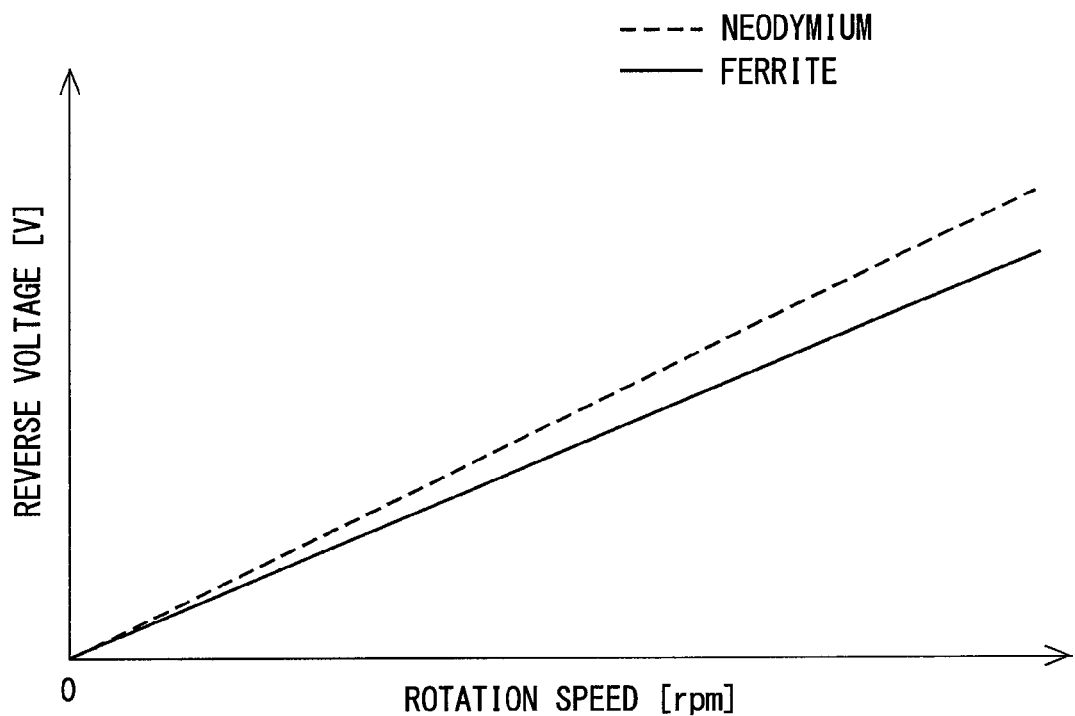
FIG. 18 is a graph illustrating a relationship between a motor rotation speed and a reverse voltage at the time of one-system failure in the motor using the neodymium magnet or the ferrite magnet.

In this example, the ferrite magnet is small in the magnetic force, and relatively low in the back electromotive force derived from the failure system as compared with the neodymium magnet used for the conventional motor of the EPS. For example, FIG. 18 is a graph showing relationships between a motor rotation speed and a reverse voltage in a case where the neodymium magnet is used as a permanent magnet of a brushless motor having a certain configuration, and a case in which the ferrite magnet is used as the permanent magnet. As illustrated in FIG. 18, when the ferrite magnet is used, the back electromotive force becomes lower as the motor rotation speed is higher as compared with the case in which the neodymium magnet is used.

Therefore, in the second embodiment, because the break torque generated in the failure system is small as compared with the conventional art, it is easy to compensate the break torque by the output of the normal system.

(2) The control unit 66 according to the second embodiment further includes the maximum current limit units 161 and 162 that limit the dq-axis current command value for each system of the winding sets.

When a failure in the inverters 601, 602, or the winding sets 801, 802 in any one system is detected by the failure detection units 711 and 712, the maximum current limit unit 161 or 162 increases the maximum current limit value Ilim1 or Ilim2 more as the estimated temperature Te estimated by the temperature estimation unit 74 is higher for the dq-axis current command value of the winding sets in the normal system.

With the above operation, the maximum torque is restrained from decreasing according to a rising of the estimated temperature Te of the ferrite magnets 43, and the brake torque can be properly compensated.

(3) In addition, in the second embodiment, in the two-system normal state, the advantages resulting from the current limit control and the temperature rising control are obtained as in the first embodiment.

Other Embodiments (a) The brushless motor according to the present disclosure is not limited to three phases, but may be a multiphase AC motor of four or more phases. The combination of the inverter with the winding set corresponding to the inverter is not limited to the two systems, but may be three or more systems.

(b) The specific configuration of the control unit 10 is not limited to the configuration of the above embodiment. For example, the switching element may be a field effect transistor other than the MOSFET or an IGBT.

(c) The specific configuration of the motor 80 is not limited to the configuration of the above embodiment. For example, the configuration of the motor 80 may be various surface permanent magnets (SPM), or various interior permanent magnets (IPM).

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A motor control device that controls energization of a brushless motor for an electric power steering device that assists a steering operation, the brushless motor comprising a stator having a plurality of winding sets for a plurality of systems respectively, and a rotator having a ferrite magnet, the motor control device comprising:
   a plurality of inverters for the systems respectively, each of which corresponds to a winding set of a respective system, and supplies an alternating current to the winding set of the respective system;
   a current command value calculation device that calculates a dq-axis current command value for energizing the winding sets;
   a temperature estimation device that estimates temperature of the ferrite magnet; and
   a temperature rising control device that calculates a temperature rising dq-axis current command value, to be added to the dq-axis current command value, for flowing a temperature rising current in the winding sets when an estimated temperature is lower than a predetermined value;
   a maximum current limit device that controls the dq-axis current command value, wherein:
   the maximum current limit device decreases a maximum current limit value of the dq-axis current command value when the temperature estimated by the temperature estimation device is reduced.

2. The motor control device according to claim 1, wherein:
   the temperature rising control device sets the temperature rising dq-axis current command value so that a q-axis sum of the temperature rising current in all of the systems becomes zero.

3. The motor control device according to claim 2, wherein:
   the temperature rising control device sets the temperature rising dq-axis current command value so that each of a d-axis sum and a q-axis sum of the temperature rising current in all of the systems becomes zero.

4. The motor control device according to claim 1, further comprising:
   a failure detection device that detects a failure of one of the inverters and the winding sets, wherein:
   when the failure of one of an inverter and a corresponding winding set in one of the systems is detected by the failure detection device, the motor control device stops an output from the inverter in a failure system, and controls an output from an inverter in a normal system to compensate a brake torque generated in the failure system.

5. The motor control device according to claim 4, further comprising:
   a maximum current limit device that controls the dq-axis current command value for each of the winding sets in a respective system, wherein:
   when the failure of one of the winding set and the inverter in one of the systems is detected by the failure detection device, the maximum current limit device increases a maximum current limit value of the dq-axis current command value in the normal system when the temperature estimated by the temperature estimation device is increased.

6. A motor control device that controls energization of a brushless motor for an electric power steering device that assists a steering operation, the brushless motor comprising a stator having a plurality of winding sets for a plurality of systems respectively, and a rotator having a ferrite magnet, the motor control device comprising:
   a plurality of inverters for the systems respectively, each of which corresponds to a winding set of a respective system, and supplies an alternating current to the winding set of the respective system;
   a current command value calculation device that calculates a dq-axis current command value for energizing the winding sets;
   a temperature estimation device that estimates temperature of the ferrite magnet; and
   a temperature rising control device that calculates a temperature rising dq-axis current command value, to be added to the dq-axis current command value, for flowing a temperature rising current in the winding sets when an estimated temperature is lower than a predetermined value, wherein:
   the temperature rising control device sets the temperature rising dq-axis current command value so that a q-axis sum of the temperature rising current in all of the systems becomes zero.

* * * * *